United States Patent
Wang et al.

(10) Patent No.: US 10,043,064 B2
(45) Date of Patent: Aug. 7, 2018

(54) METHOD AND APPARATUS OF DETECTING OBJECT USING EVENT-BASED SENSOR

(71) Applicant: SAMSUNG ELECTRONICS CO., LTD., Suwon-si (KR)

(72) Inventors: Qing Wang, Beijing (CN); Wentao Mao, Beijing (CN); Ping Guo, Beijing (CN); Shandong Wang, Beijing (CN); Xiaotao Wang, Beijing (CN); Guangqi Shao, Beijing (CN); Eric Hyunsurk Ryu, Hwaseong-si (KR); Kyoobin Lee, Seoul (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 14/995,262

(22) Filed: Jan. 14, 2016

(65) Prior Publication Data

US 2016/0203614 A1    Jul. 14, 2016

(30) Foreign Application Priority Data

Jan. 14, 2015  (CN) .......................... 2015 1 0018291
Dec. 8, 2015   (KR) ........................ 10-2015-0173974

(51) Int. Cl.
*G06K 9/00* (2006.01)
*G06K 9/20* (2006.01)
*G06K 9/62* (2006.01)
*G06K 9/72* (2006.01)

(52) U.S. Cl.
CPC .......... *G06K 9/00335* (2013.01); *G06K 9/209* (2013.01); *G06K 9/6271* (2013.01); *G06K 9/72* (2013.01)

(58) Field of Classification Search
CPC .. G06K 9/00335; G06K 9/209; G06K 9/6271; G06K 9/72
See application file for complete search history.

(56) References Cited

U.S. PATENT DOCUMENTS

| | | | |
|---|---|---|---|
| 8,345,984 B2* | 1/2013 | Ji | G06K 9/4628 382/103 |
| 8,548,231 B2* | 10/2013 | Shet | G06K 9/626 382/156 |
| 8,798,375 B1* | 8/2014 | Chang | G06K 9/6202 382/181 |
| 2005/0094879 A1 | 5/2005 | Harville | |
| 2005/0102246 A1* | 5/2005 | Movellan | G06K 9/00248 706/12 |
| 2005/0180637 A1* | 8/2005 | Ikeda | G06K 9/00335 382/224 |

(Continued)

FOREIGN PATENT DOCUMENTS

| KR | 10-2012-0089948 A | 8/2012 |
|---|---|---|
| KR | 10-2014-0056986 A | 5/2014 |

*Primary Examiner* — Kim Vu
*Assistant Examiner* — Molly Delaney
(74) *Attorney, Agent, or Firm* — Sughrue Mion, PLLC

(57) ABSTRACT

A method and apparatus for detecting an object using an event-based sensor is provided. An object detection method includes determining a feature vector based on target pixels and neighbor pixels included in an event image, and determining a target object corresponding to the target pixels based on the feature vector.

16 Claims, 9 Drawing Sheets

(56) References Cited

U.S. PATENT DOCUMENTS

| | | |
|---|---|---|
| 2009/0226044 A1 | 9/2009 | Ngan et al. |
| 2010/0104256 A1* | 4/2010 | Tsurumi ............ G06K 9/00335 |
| | | 386/241 |
| 2010/0295783 A1 | 11/2010 | El Dokor et al. |
| 2010/0329560 A1 | 12/2010 | Li et al. |
| 2011/0304541 A1 | 12/2011 | Dalal |
| 2013/0028476 A1 | 1/2013 | Craig et al. |
| 2013/0051662 A1* | 2/2013 | Shiozaki ............ G06K 9/00228 |
| | | 382/159 |
| 2014/0019388 A1 | 1/2014 | Kingsbury et al. |
| 2014/0231623 A1 | 8/2014 | Serrano Gotarredona et al. |
| 2014/0354537 A1* | 12/2014 | Park ....................... G06F 3/017 |
| | | 345/156 |

\* cited by examiner

METHOD AND APPARATUS OF DETECTING OBJECT USING EVENT-BASED SENSOR

CROSS-REFERENCE TO RELATED APPLICATIONS

This application claims priority from Chinese Patent Application No. 201510018291.1, filed on Jan. 14, 2015, in the State Intellectual Property Office of the People's Republic of China, and Korean Patent Application No. 10-2015-0173974, filed on Dec. 8, 2015 in the Korean Intellectual Property Office, the disclosures of which are incorporated herein by reference in their entirety.

BACKGROUND

1. Field

Methods and apparatuses consistent with exemplary embodiments relate to detecting an object using an event-based sensor.

2. Description of the Related Art

Detection of the motion of an object is an issue being currently researched in computer image related fields and is widely applicable to many areas, such as reconnaissance for military purposes, monitoring systems, and human computer interaction (HCI), for example. An HCI experience may be enhanced by capturing, tracing, and analyzing the motion of an object and by switching an operating pattern of a terminal device based on the motion of the analyzed motion object. The terminal device may be, for example, a mobile terminal, a camcorder, smart glasses, or a smart television (TV).

In general, the motion of an object may be detected by obtaining an image associated with a scene in which the moving object is present using a typical imaging device based on a charged coupled device (CCD) or a complementary metal oxide semiconductor (CMOS), by classifying a motion section and a background section of the image, and by identifying the moving object based on the motion section. However, identifying the moving object in a scene typically requires a large amount of time and thus, may not be readily employed to quickly trace the moving object.

Further, a moving object tracing method according to the related art may quickly capture a moving object in a state in which an imaging device is open. Accordingly, the moving object tracing method may use a relatively large amount of energy and thus, may not be readily applicable to a portable device. Accordingly, there is a need for a moving object detection method that may use a relatively small amount of energy and quickly capture a moving object.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an object detection method including generating an event image based on an event signal output by an event-based sensor, determining a feature vector based on target pixels and neighbor pixels included in the event image, and determining a target object corresponding to the target pixels based on the feature vector.

The determining of the target object may include inputting the feature vector into a classifier that is trained by a learning sample comprising a target area and a neighbor area adjacent to the target area, and determining the target object based on a result output by the classifier. The determining of the target object may include determining a type of the target object and a position of the target object. The determining of the target object may include determining a position of the target object based on positions of pixels corresponding to the target object.

The determining of the feature vector may include segmenting the event image into a plurality of areas, and sampling the neighbor pixels in a neighbor area adjacent to a target area that includes the target pixels, from among the plurality of areas. The sampling of the neighbor pixels may include arbitrarily sampling a preset number of pixels in the neighbor area.

The object detection method may further include verifying a type of the target object. The verifying may include verifying the type of the target object based on a relationship between the target object and a neighbor object corresponding to the neighbor pixels. The verifying may include verifying the type of the target object based on a valid range around a position of the target object, and the valid range may be determined based on a previous position of the target object and a predicted movable range of the type.

The object detection method may further include determining a motion trajectory of the target object based on a position of the target object, and generating an action command corresponding to the motion trajectory. The generating of the action command may include segmenting the motion trajectory into a plurality of action segments, extracting information about an order of the action segments, and generating the action command based on the information about the order of the action segments, and the information about the order of the action segments may include at least one of position information, route information, movement direction information, speed information, and acceleration information. The generating of the action command may include combining different types of objects into at least one object and determining a motion trajectory of the at least one object based on a motion trajectory of each of the types of objects, extracting information about the motion trajectory of the at least one object, and generating the action command based on the information, and the information may include at least one of position information, route information, movement direction information, speed information, and acceleration information.

According to an aspect of another exemplary embodiment, there is provided a learning method including generating a learning sample including a target area and a neighbor area adjacent to the target area, and training a classifier about a type of a target object corresponding to the target area based on the learning sample.

The generating of the learning sample may include generating a sample image based on an event signal of an event-based sensor, segmenting the sample image into a plurality of areas, and configuring target pixels included in the target area and neighbor pixels included in the neighbor area among the plurality of areas as a single learning sample.

The training of the classifier may include training the classifier based on a deep belief network (DBN). The training of the classifier may include adjusting a parameter of the classifier based on a learning target type of the learning sample and a classification result of the classifier for the learning sample. The learning target type may include a type of the target object and a type of a neighbor object corresponding to the neighbor area.

According to an aspect of another exemplary embodiment, there is provided an object detection apparatus including a processor configured to generate an event image based on an event signal output by an event-based sensor, and a classifier configured to determine a feature vector based on target pixels and neighbor pixels included in the event image, and to determine a target object corresponding to the target pixels based on the feature vector.

The classifier may be further configured to determine the target object based on a result obtained by inputting the feature vector into a classifier that is trained by a learning sample about a target area and a neighbor area adjacent to the target area.

The object detection apparatus may further include a verifier configured to verify a type of the target object based on a relationship between the target object and a neighbor object corresponding to the neighbor pixels.

BRIEF DESCRIPTION OF THE DRAWINGS

The above and/or other aspects and advantages of exemplary embodiments will become apparent and more readily appreciated from the following detailed description of certain exemplary embodiments, taken in conjunction with the accompanying drawings in which.

DETAILED DESCRIPTION

Figure 1:
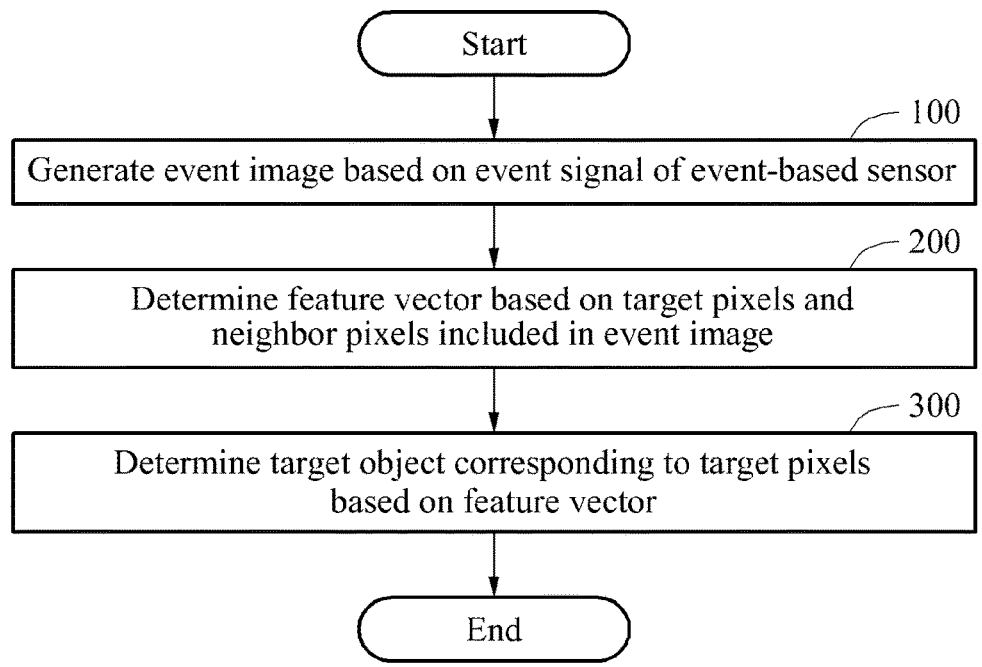
FIG. 1 is a flowchart illustrating an object detection method according to an exemplary embodiment.

Reference will now be made in detail to exemplary embodiments which are illustrated in the accompanying drawings, wherein like reference numerals refer to like elements throughout. Exemplary embodiments are described below in order to explain the present disclosure by referring to the figures. exemplary example embodiments may be applicable to a user interface. For example, the exemplary embodiments may be applied to recognize a swipe motion in a non-contact motion recognition interface. In the exemplary embodiments, repetitive swipe motions may be quickly recognized using a small amount of power.

FIG. 1 is a flowchart illustrating an object detection method according to an exemplary embodiment.

Referring to FIG. 1, in operation 100, an object detection apparatus according to an exemplary embodiment may generate an event image based on an event signal of an event-based sensor. The event-based sensor may include a plurality of sensing pixels. The event-based sensor may generate an event signal that includes identification information of an active pixel having detected an event among the plurality of sensing pixels. The event-based sensor may operate based on a neuromorphic sensing method.

An event may include an event associated with a change in an input. For example, the event may include an event indicating a change in the intensity of incident light, an event indicating a change in a color of incident light, an event indicating a change in an amplitude of input sound, an event indicating a change in a frequency of input sound, and an event indicating a change in the intensity of an input stimulus. The plurality of sensing pixels included in the event-based sensor may detect an event, for example, an event indicating a change in the intensity of incident light. A sensing pixel having detected the event, from among the plurality of sensing pixels, may be referred to as an active pixel. The active pixel may generate an active signal in response to detecting the event.

The event-based sensor may generate an event signal that includes identification information identifying an active pixel. For example, the event-based sensor may generate an event signal that includes an address identifying an active pixel based on the active signal generated through the active pixel. The event-based sensor may generate and output the event signal time-asynchronously and thus, may operate at a relatively low power and a relatively high rate compared to a frame-based vision sensor that scans all of the pixels on a frame-by-frame basis.

Further, an event flow signal collected by a dynamic vision sensor may be converted to an image signal by combining an accident flow accumulated at preset time intervals, for example, every 20 milliseconds (ms) and a position of an accident point. The converted image signal may approximately apply silhouette and segment pattern information of a moving object and may directly ignore an immovable object in a background.

The object detection apparatus may generate an event image based on an event signal. The event image will be described with reference to FIG. 2.

Figure 2:
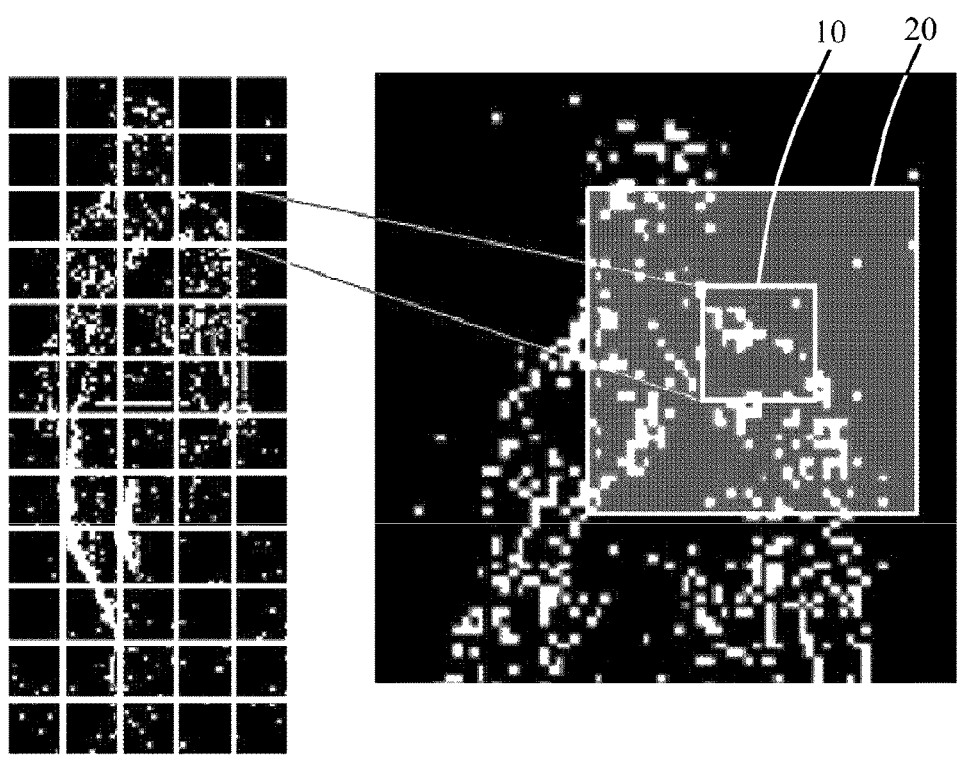
FIG. 2 illustrates an example of an event image according to an exemplary embodiment.

FIG. 2 illustrates an example of an event image according to an example embodiment. Referring to FIG. 2, the event image is segmented into a plurality of areas. The plurality of areas may include a target area 10 and a neighbor area 20. The target area 10 denotes an area in which object detection is to be performed. The target area 10 may be at least one of the plurality of areas. The neighbor area 20 denotes an area or areas that neighbor, that is, are adjacent to the target area 10. Pixels included in the target area 10 may be referred to as target pixels. Also, pixels included in the neighbor area 20 may be referred to as neighbor pixels. The accuracy of object detection may be enhanced by segmenting the event image into the plurality of areas and by using the neighbor area 20 to detect an object in the target area 10.

The object detection apparatus according to an exemplary embodiment may generate the event image based on an event stream measured in a desired (or alternatively predetermined) time section. The event stream may include a plurality of event signals. The object detection apparatus may filter the event signal prior to generating the event image. A process of filtering the event signal will be described with reference to FIG. 3.

Figure 3:
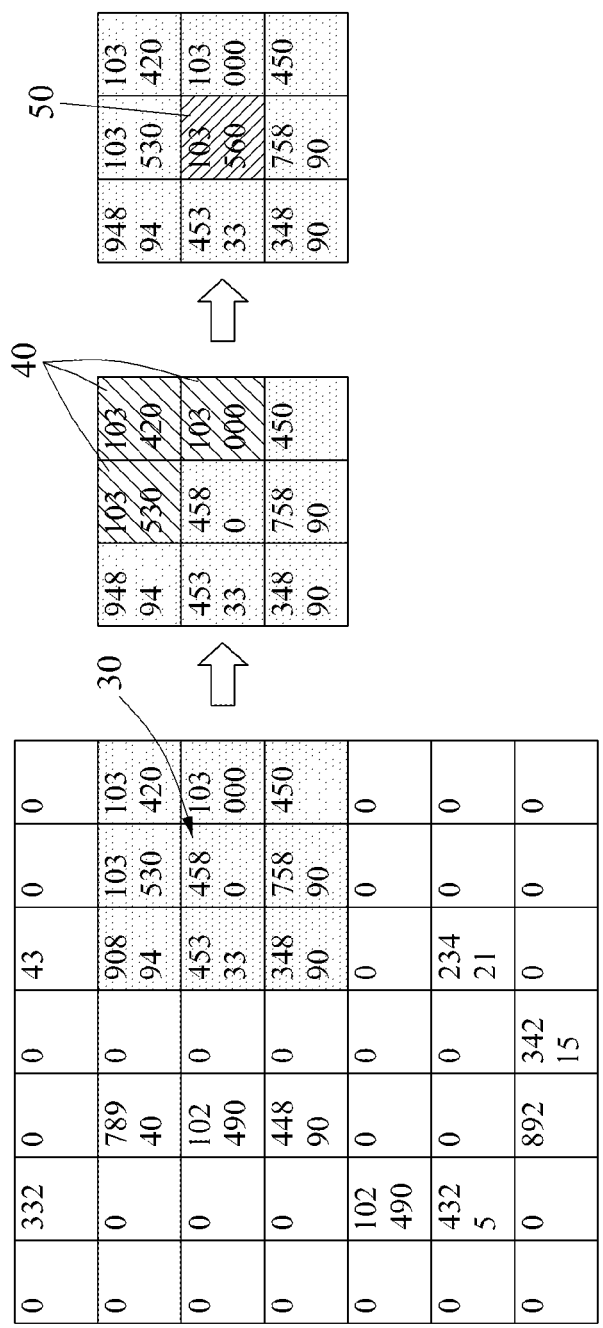
FIG. 3 illustrates a process of filtering an event signal according to an exemplary embodiment.

FIG. 3 illustrates a process of filtering an event signal according to an exemplary embodiment. FIG. 3 illustrates a timestamp map in which event signals are recorded. An event image may be generated based on a valid timestamp among timestamps recorded in the timestamp map. A valid timestamp is a timestamp not filtered out. A specific timestamp may be filtered out based on a value of a neighbor timestamp. For example, whether to filter out a first timestamp may be determined based on a difference between a value of the first timestamp and a value of a neighbor timestamp adjacent to the first timestamp. The neighbor timestamp having a value less than a threshold with respect to the first timestamp may be referred to as a supporter. A timestamp having a preset number or more of supporters may be determined as the valid timestamp.

For example, a timestamp having three or more supporters may be determined as a valid timestamp. In FIG. 3, when a timestamp 30 is updated with a timestamp 50 in response to an occurrence of an event, the timestamp 50 has three supporters 40. Accordingly, the timestamp 50 may be determined as the valid timestamp.

Referring again to FIG. 1, in operation 200, the object detection apparatus may determine a feature vector based on target pixels and neighbor pixels included in the event image. The target pixels and the neighbor pixels may be used together to detect the target object. The neighbor pixels may be sampled in the neighbor area 20 of FIG. 2. For example, a preset number of neighbor pixels may be arbitrarily sampled in the neighbor area 20. Also, a variety of methods may be used to sample the neighbor pixels.

In operation 300, the object detection apparatus may determine a target object corresponding to the target pixels based on the feature vector. The object detection apparatus may determine the target object based on a result value of inputting the feature vector into a classifier that is trained regarding about the target area 10 and the neighbor area 20 by using a learning sample. A target object is an object included in the target area 10. The target object may be a moving object.

The object detection apparatus may determine a type of the target object and a position of the target object. For example, when the object detection apparatus traces a gesture of a user, the type of the target object may be a head, a hand, or a torso. The type of the target object may be learned in advance. For example, the object detection apparatus may determine a type of a first target object corresponding to a first target area as a hand of a user based on the first target area and a first neighbor area adjacent to the first target area. Also, the object detection apparatus may determine a type of a second target object corresponding to a second target area as a head of the user based on the second target area and a second neighbor area adjacent to the second target area. The object detection apparatus may trace movements of the detected hand and head of the user. The first neighbor object corresponding to the first neighbor area may be used to determine the first target object. Also, the first neighbor object may be used to verify the first target object.

When the type of the target object is determined, the object detection apparatus may determine a position of the target object of the determined type. For example, the object detection apparatus may determine a position of the target object based on positions of pixels included in the target object. Also, the object detection apparatus may determine a center of pixels included in the target object as a position of the target object. The object detection apparatus may determine a position of the target object using a variety of cluster analysis methods. For example, the object detection apparatus may determine the center of the target object using a K-means cluster analysis method.

The object detection apparatus may repeat operations 200 and 300 with respect to the plurality of target areas included in the event image. Accordingly, the object detection apparatus may determine target objects corresponding to the respective areas included in the event image, and may trace motions of the target objects.

Figure 4:
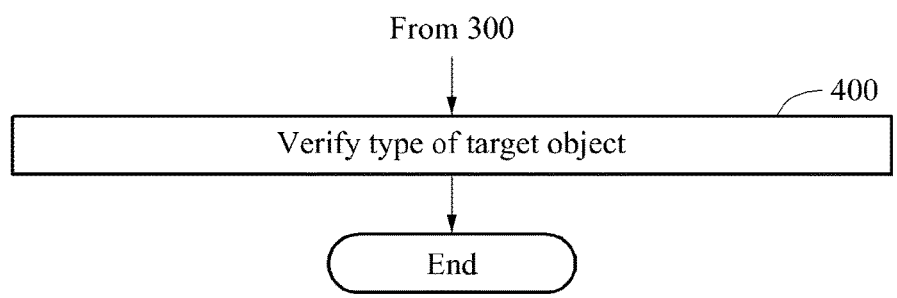
FIG. 4 is a flowchart illustrating an object verification process according to an exemplary embodiment.

FIG. 4 is a flowchart illustrating an object verification process according to an exemplary embodiment.

Referring to FIG. 4, in operation 400, the object detection apparatus may verify a type of the target object. The object detection apparatus may verify the type of the target object after determining a type of an object. The object detection apparatus may enhance the rate and efficiency of object detection by verifying the type of the object.

The object detection apparatus may verify the type of the target object based on a valid shape. The valid shape is a shape that corresponds to an object of a specific type. The object detection apparatus may determine in advance a valid shape for each type of the object. For example, the valid shape may include a basic shape of a head or a basic shape of a hand. When the type of the target object belongs to the valid shape, the object detection apparatus may determine that the type of the target object is valid. The valid shape may be determined based on the type of the target object for each of a number of types.

The object detection apparatus may verify the type of the target object based on a valid range. The valid range may indicate a position range in which an object of a specific type may be present. The object detection apparatus may determine in advance the valid range for each type of an object. For example, the valid range may include a position at which a head may be present or a position within which an arm is movable. The valid range may be determined based on a relationship between a plurality of objects. For example, the valid range may be determined based on a relationship, such as a direct connection between the head and the torso that are directly connected to each other and an indirect connection between the head and the arm that cannot be directly connected to each other. For example, the valid range may be determined based on a range within which the head is movable with respect to a position of the torso or a range within which the arm is movable with respect to a position of the torso. A predicted movable range may be considered together with a previous position of the target object. For example, a predicted movable range of the arm may be determined if t=2, based on a position of the arm if t=1. When the position of the target object is within the valid range, the object detection apparatus may determine that the type of the target object is valid. The valid range may be determined based on a position of the target object for each of a number of types and a change in the position. The object detection apparatus may verify the target of the target object and then trace the target object of the verified type.

Figure 5:
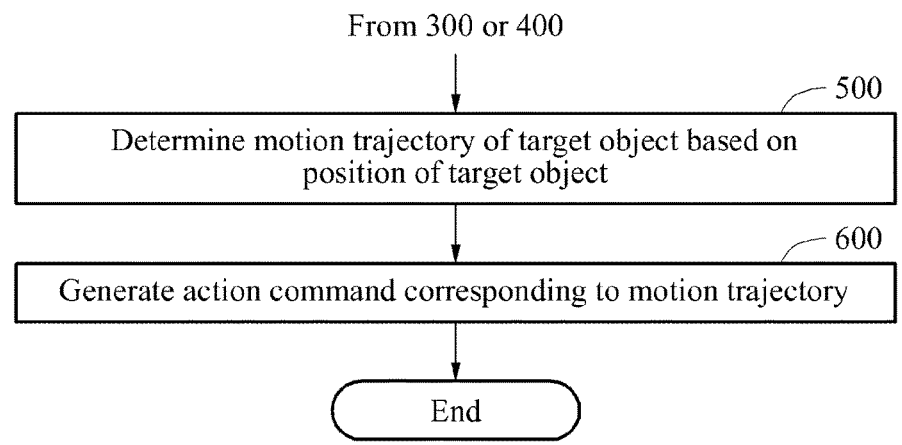
FIG. 5 is a flowchart illustrating a process of generating an action command according to an exemplary embodiment.

FIG. 5 is a flowchart illustrating a process of generating an action command according to an exemplary embodiment.

Referring to FIG. 5, in operation 500, the object detection apparatus may determine a motion trajectory of the target object based on the position of the target object. The object detection apparatus may identify the type and the position of the target object and then determine the motion trajectory of the target object based on the identified position of the target object. A variety of methods, for example, a smoothing filter or a time sequence trace algorithm, may be used to determine a motion trajectory. Due to the precision of the event-based sensor, the motion trajectory may temporarily disappear when the target object is temporarily stopped. The object detection apparatus may perform smoothing on a stopped object at a position at which the object is stopped. Smoothing may be accomplished using any of a variety of methods, for example, a Kalman filter method.

In operation 600, the object detection apparatus may generate an action command corresponding to the motion trajectory. The object detection apparatus may segment the motion trajectory into action segments, may extract information about an order of the action segments, and may generate the action command based on the extracted information. Also, the object detection apparatus may combine different types of objects into at least one object and determine a motion trajectory of the at least one object based on the motion trajectories of each of the different types of object, may extract information about the motion trajectory of the at least one object, and may generate the action command based on the extracted information. The information may include at least one of position information, route information, movement information feature, speed information, and acceleration information.

The action command may be generated based on a movement of a single target object such as a hand, or may be generated based on movements of a plurality of target objects such as the head and the hand. The movements of the plurality of target objects may be regarded as a single motion trajectory. For example, a motion trajectory of the head and a motion trajectory of the hand may be combined into a single motion trajectory and the action command may be generated based on the combined motion trajectory.

Figure 6:
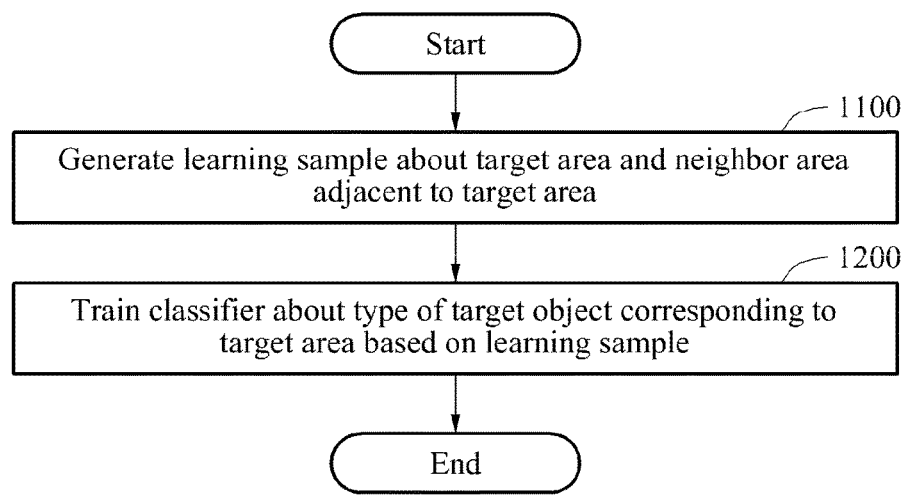
FIG. 6 is a flowchart illustrating a learning process according to an exemplary embodiment.

FIG. 6 is a flowchart illustrating a learning process according to an exemplary embodiment.

Referring to FIG. 6, in operation 1100, a learning device may generate a learning sample about a target area and a neighbor area adjacent to the target area. The learning sample may be generated based on an event signal collected by an event-based sensor. For example, the learning device may photograph various motion processes of various types of objects and may collect a sample signal using the event-based sensor. The event-based sensor may respond only to a pixel in which an event, such as a change in a brightness of the pixel, has occurred, and may transmit and store an event signal of the pixel. The event-based sensor may generate an event signal with respect to a sample signal. The event signal generated by the event-based sensor from the sample signal is referred to as a sample event signal.

Event signals collected by the event-based sensor may represent a motion silhouette of an object at a desired (or alternatively predetermined) level and a shape of the object may be verified based on the motion silhouette. Accordingly, neighbor pixels may be suitable for explaining a structure of an object corresponding to target pixels and may be helpful to in determining the object corresponding to the target pixels, that is, the type of the target object. For example, when a human body is performing exercise, a plurality of event signals may be generated and it may be determined which one of a head, a hand, and a torso, target pixels correspond to based on the target pixels and neighbor pixels that are present within a preset range from the target pixels.

Accordingly, the object detection apparatus may determine target pixels and neighbor pixels based on a sample event signal output from a sample signal through the event-based sensor, and may determine the type of a target object corresponding to the target pixels based on the target pixels and the neighbor pixels. For example, the object detection apparatus may determine a type of an object corresponding to the sample event signal based on positions of the target pixels and positions of the neighbor pixels. For example, the determined type of the object may be a head, a hand, a torso, etc.

The object detection apparatus may configure the target pixels and the neighbor pixels as a single learning sample. Also, the object detection apparatus may learn about a type of a motion object corresponding to the sample event signal by using the learning sample. A preset number of neighbor pixels may be selected by sampling neighbor pixels around the target pixels based on a set sampling range. The object detection apparatus may learn a type of a specific object by configuring the target pixels and the selected neighbor pixels into a single learning sample. The learning sample may be generated, for example, according to FIG. 7.

Figure 7:
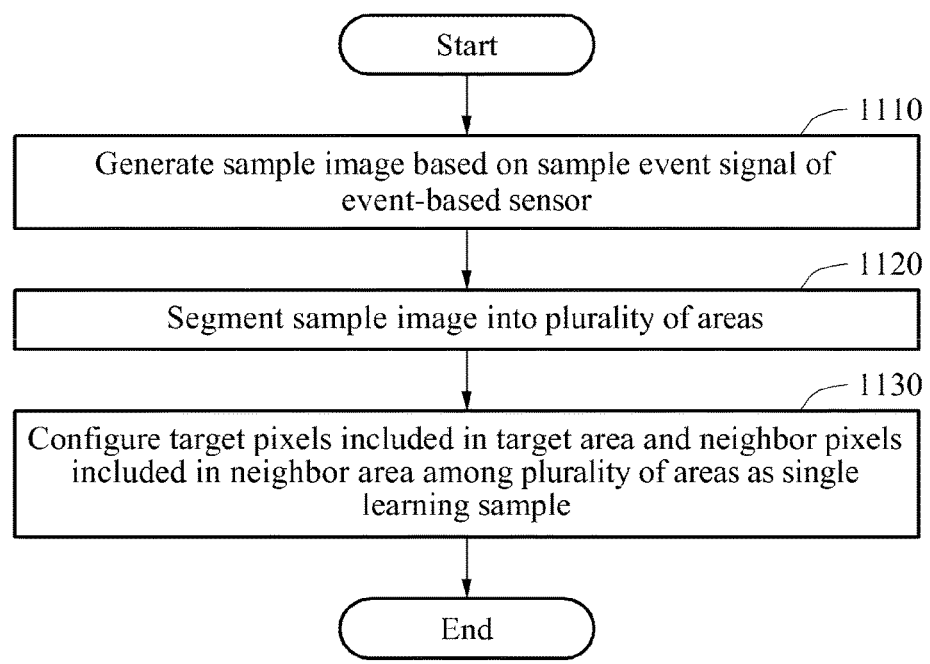
FIG. 7 is a flowchart illustrating a process of generating a learning sample according to an exemplary embodiment.

FIG. 7 is a flowchart illustrating a process of generating a learning sample according to an exemplary embodiment. Referring to FIG. 7, in operation 1110, a learning device may generate a sample image based on a sample event signal from an event-based sensor. In operation 1120, the learning device may segment the sample image into a plurality of areas. In operation 1130, the learning device may configure target pixels included in the target area and neighbor pixels included in the neighbor area from among the plurality of areas as a single learning sample. The learning device may train a classifier based on the learning sample generated through the above process.

Referring again to FIG. 6, in operation 1200, the learning device may train the classifier about a type of the target object corresponding to the target area based on the learning sample. The learning device may adjust its parameters based on whether a classification result of the classifier is appropriate. That is, the learning device may adjust a parameter of the classifier based on a learning target type of the learning sample and a classification result of the classifier for the learning sample. Here, the learning target type may include a type of the target object and a type of a neighbor object corresponding to the neighbor area. That is, the classifier may learn the target object and the neighbor object together using a single learning sample.

The classifier may be trained based on a deep belief network (DBN). In DBN-based learning, a plurality of learning samples may be used as a learning sample set. A classification model of the DBN may be obtained based on the learning sample set. A variety of methods may be applied to a detailed learning process using the DBN. For example, a plurality of repetitive learning processes may be performed with respect to the DBN using a learning sample about each type. In this example, a single learning process may include inputting, to the DBN, a learning sample set including a plurality of sample sets, comparing a learning target type of a learning sample and an output of the DBN, that is, a classification result of the classifier, adjusting a parameter of the DBN based on a comparison result, and continuing or suspending a repetition corresponding to a subsequent order and obtaining the classifier.

The output of the DBN is an estimation of a type of a corresponding motion object. The final performance of the classifier may be enhanced by comparing the output of the DBN to the learning target type, that is, a relatively accurate measurement result value, and by adjusting a parameter of the DBN using a direction propagation learning technology based on a difference between the output of the DBN and the measurement result value. A structure of the classifier will be further described with reference to FIGS. 8 and 9.

Figure 8:
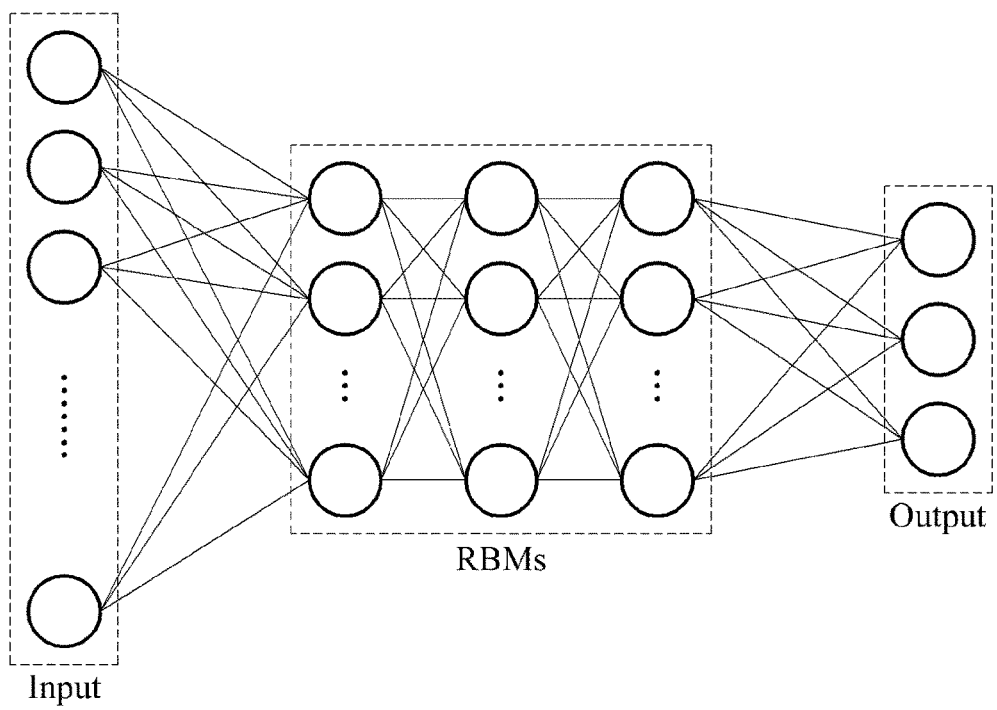
FIG. 8 illustrates a structure of a classifier according to an exemplary embodiment.

FIG. 8 illustrates a structure of a classifier according to an exemplary embodiment. Referring to FIG. 8, the classifier may include restricted Boltzmann machines (RBMs). The classifier may generate an output value from an input value using the RBMs. A parameter of the classifier may define the weight of the RBMs. The parameter of the classifier may be adjusted based on a desired weight of the RBMs. For example, the weight of RBMs may be adjusted so that an output value of the classifier may approximate a preset output value, that is, a learning target type. The input value may be a feature vector. The feature vector may be generated based on target pixels and neighbor pixels. The output value may be a type of a target object. For example, the output value may be a head, a hand, or a torso. Accordingly, the classifier may generate the output value corresponding to the type of the target object from the feature vector. That is, the classifier may detect the target object based on the target pixels and the neighbor pixels.

Figure 9:
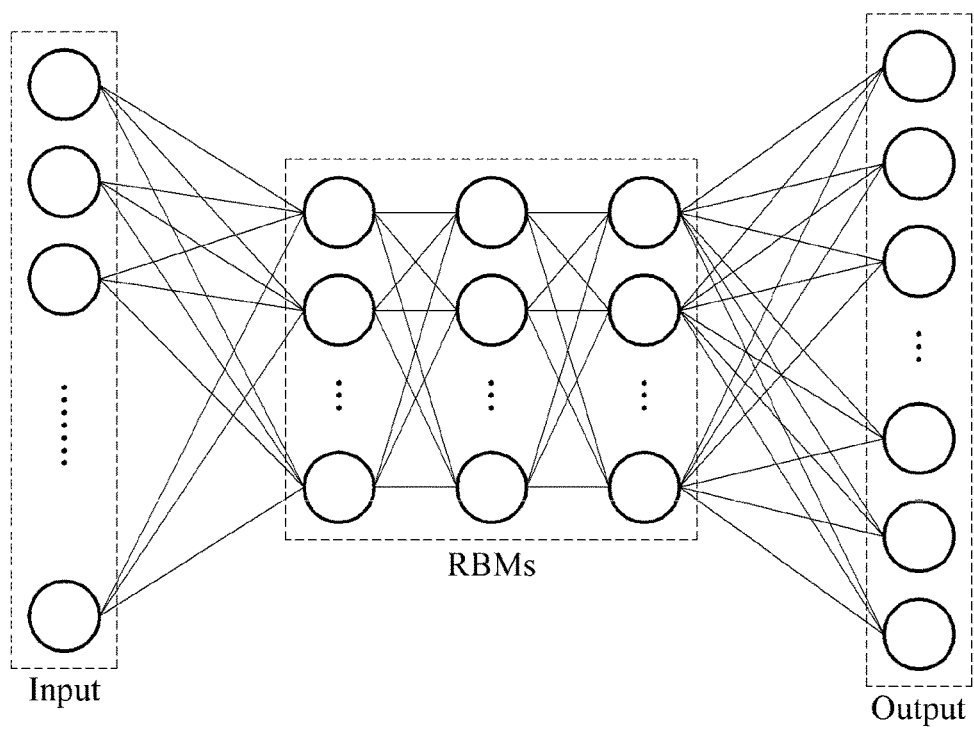
FIG. 9 illustrates a structure of a classifier according to another exemplary embodiment.

FIG. 9 illustrates a structure of a classifier according to another exemplary embodiment. Referring to FIG. 9, the classifier may generate an output value from a feature vector. The may be generated based on target pixels and neighbor pixels. The output value may be a type of a target object and a type of a neighbor object. That is, the classifier may detect the type of the target object corresponding to the target pixels and the type of the neighbor object corresponding to the neighbor pixels. For example, the classifier may simultaneously detect the type of the target object and the type of the neighbor object based on the feature vector. The detected type of the neighbor object may be used to detect and verify the type of the target object. Accordingly, detection accuracy for the type of the target object may be enhanced.

Figure 10:
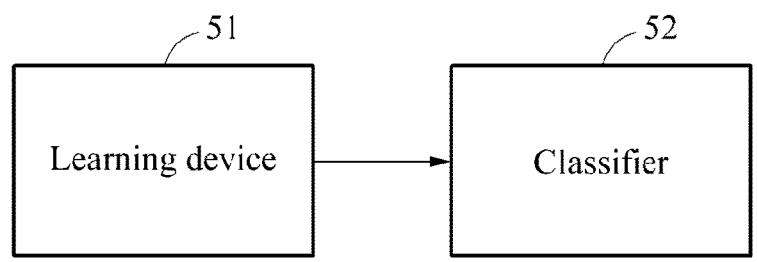
FIG. 10 is a block diagram illustrating a learning device and a classifier according to an exemplary embodiment.

FIG. 10 is a block diagram illustrating a learning device and a classifier according to an exemplary embodiment.

Referring to FIG. 10, a learning device 51 may train a classifier 52 based on a learning sample about a target area and a neighbor area adjacent to the target area. The learning sample may be generated based on target pixels and neighbor pixels. The learning device 51 may adjust a parameter of the classifier 52 based on an output value of the classifier 52 with respect to the learning sample. The classifier 52 may include a DBN. In addition, the aforementioned learning method may be applied to the learning device 51 and the classifier 52.

Figure 11:
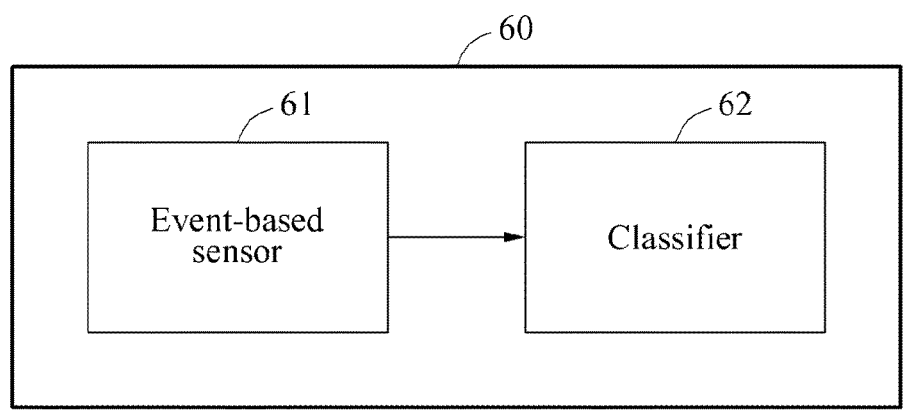
FIG. 11 is a block diagram illustrating an object detection apparatus according to an exemplary embodiment.

FIG. 11 is a block diagram illustrating an object detection apparatus according to an exemplary embodiment.

Referring to FIG. 11, an object detection apparatus 60 may include an event-based sensor 61 and a classifier 62. The event-based sensor 61 may include a plurality of sensing pixels. The event-based sensor may generate an event signal that includes identification information of an active pixel having detected an event among the plurality of sensing pixels. The classifier 62 may detect a target object based on the event signal. The classifier 62 may be trained by the aforementioned learning device. The object detection apparatus 60 may include the learning device. The classifier 62 may be trained through the learning device included in the object detection apparatus 60.

The object detection apparatus 60 may include a processor. The processor may generate an event image based on an event signal and may segment the event image into a plurality of areas. The processor may generate a feature vector based on a target area and a neighbor area. Also, the feature vector may be input to the classifier 62 and a type and a position of the target object may be obtained from an output of the classifier 62. The processor may trace the target object. The processor may generate an action command based on a movement of the target object.

The exemplary embodiments described herein may be implemented using hardware components and software components. For example, the hardware components may include microphones, amplifiers, band-pass filters, audio to digital convertors, non-transitory computer memory and processing devices. A processing device may be implemented using one or more special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical equipment, or computer storage medium or device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An object detection method comprising:
generating an event image based on an event signal output by an event-based sensor, the event image comprising a plurality of target pixels and a plurality of neighbor pixels;
determining a feature vector based on the plurality of target pixels and the plurality of neighbor pixels;
determining a target object corresponding to the plurality of target pixels based on the feature vector; and
verifying a type of the target object based on a valid range around a position of the target object, wherein the valid range is determined based on a previous position of the target object and a possible movable range of the type of the target object with respect to a neighbor object corresponding to the plurality of neighbor pixels.

2. The object detection method of claim 1, wherein the determining the target object comprises:
inputting the feature vector into a classifier that is trained by a learning sample comprising a target area and a neighbor area adjacent to the target area, and determining the target object based on a result output by the classifier.

3. The object detection method of claim 1, wherein the determining the target object comprises:
determining the type of the target object and the position of the target object.

4. The object detection method of claim 1, wherein the determining the target object comprises:
determining the position of the target object based on positions of pixels corresponding to the target object.

5. The object detection method of claim 1, wherein the determining the feature vector comprises:
segmenting the event image into a plurality of areas; and
sampling the plurality of neighbor pixels in a neighbor area adjacent to a target area that comprises at least one target pixel among the plurality of areas.

6. The object detection method of claim 5, wherein the sampling the plurality of neighbor pixels comprises:
sampling a preset number of pixels in the neighbor area.

7. The object detection method of claim 1, wherein the possible movable range of the type of the target object is determined based on a connection relationship between the target object and the neighbor object.

8. The object detection method of claim 1, further comprising:
determining a motion trajectory of the target object based on the position of the target object; and
generating an action command corresponding to the motion trajectory.

9. The object detection method of claim 8, wherein the generating the action command comprises:
segmenting the motion trajectory into a plurality of action segments;
extracting information about the plurality of action segments; and
generating the action command based on the information about the plurality of action segments,
wherein the information about the plurality of action segments comprises at least one of position information, route information, movement direction information, speed information, and acceleration information.

10. The object detection method of claim 8, wherein the generating the action command comprises:
combining a plurality of different objects into a combined object and determining a motion trajectory of the combined object based on a motion trajectory of each of the plurality of different objects;
extracting information about the motion trajectory of the combined object; and
generating the action command based on the information about the motion trajectory of the combined object,
wherein the information about the motion trajectory of the combined object comprises at least one of position information, route information, movement direction information, speed information, and acceleration information.

11. A learning method comprising:
generating a learning sample comprising a target area and a neighbor area adjacent to the target area, wherein a learning target type of the learning sample comprises a type of a target object corresponding to the target area and a type of a neighbor object corresponding to the neighbor area;
training a classifier to identify the type of the target object and the type of the neighbor object based on the learning sample,
wherein the training the classifier comprises adjusting a parameter of the classifier based on the learning target type of the learning sample and a classification result of the classifier with respect to the type of the target object and the type of the neighbor object, and
wherein the identified type of the neighbor object is used to verify the identified type of the target object.

12. The learning method of claim 11, wherein the generating the learning sample comprises:
generating a sample image based on an event signal of an event-based sensor;
segmenting the sample image into a plurality of areas; and
configuring target pixels included in the target area and neighbor pixels included in the neighbor area from among the plurality of areas as the learning sample.

13. The learning method of claim 11, wherein the training the classifier comprises training the classifier based on a deep belief network (DBN).

14. An object detection apparatus comprising:
a processor configured to generate an event image based on an event signal output by an event-based sensor, the event image comprising a plurality of target pixels and a plurality of neighbor pixels; and
a classifier configured to determine a feature vector based on the plurality of target pixels and the plurality of neighbor pixels, and to determine a target object corresponding to the plurality of target pixels based on the feature vector; and
a verifier configured to verify a type of the target object based on a valid range around a position of the target object, wherein the valid range is determined based on a previous position of the target object and a possible movable range of the type of the target object with respect to a neighbor object corresponding to the plurality of neighbor pixels.

15. The object detection apparatus of claim 14, wherein the classifier is trained by a learning sample comprising a target area and a neighbor area adjacent to the target area.

16. The object detection apparatus of claim 14, wherein the possible movable range of the type of the target object is determined based on a connection relationship between the target object and the neighbor object.

* * * * *